United States Patent [19]

Yachabach

[11] 3,804,984

[45] Apr. 16, 1974

[54] EMERGENCY CIRCUITRY FOR COIN TELEPHONE

[75] Inventor: Jerry J. Yachabach, Lakeland, Fla.

[73] Assignee: Teltronics, Inc., Lakeland, Fla.

[22] Filed: Jan. 25, 1972

[21] Appl. No.: 220,662

[52] U.S. Cl. .............................. 179/6.3 R, 179/90 B

[51] Int. Cl. ........................ H04m 17/02, H04m 1/30

[58] Field of Search .............. 179/6.3 R, 90 R, 90 B

[56] References Cited

UNITED STATES PATENTS

| | | | |
|---|---|---|---|
| 3,657,481 | 4/1972 | DiMassimo | 179/6.3 R |
| 3,592,974 | 7/1971 | DiMassimo | 179/90 B |
| 3,582,555 | 6/1971 | Kok | 179/90 R |
| 3,406,256 | 10/1968 | Stommen | 179/6.3 R |

*Primary Examiner*—William C. Cooper
*Attorney, Agent, or Firm*—A. Yates Dowell, Jr.

[57] ABSTRACT

A coin telephone system having an emergency circuit by providing coin free access to an emergency operator and alternately coin free service to a general purpose telephone operator without requiring the usual dialing of an emergency number or "0".

A push button is provided for automatically "dialing" the emergency number for the emergency operator by a circuit which generates electrical pulses which are counted to predetermined numbers by an electric counter and transmitted over the usual telephone circuitry so as to provide the conventional dialing signals for the numbers of the emergency call. Similarly, a second push button is provided which provides for operating a circuit for counting pulses generated by the system to provide the regular telephone circuitry with a digital indication of the number "10" or "0" which will alert the general purpose telephone operator. Both of these push buttons are operable without the deposit of a coin by providing for bypassing the conventional coin controlled circuitry of the telephone.

14 Claims, 3 Drawing Figures

EMERGENCY CIRCUITRY FOR COIN TELEPHONE

FIELD OF THE INVENTION

This invention relates to coin telephone systems, and more particularly to circuitry for use in coin stations, enabling the calling of an emergency operator by merely pressing a button which automatically generates and sends signals corresponding to an emergency telephone number which will alert the emergency operator so that a caller can give an emergency message to the emergency operator without either depositing a coin in the telephone or dialing the emergency number and alternately a second button can be pushed to provide access to a general purpose operator without requiring the deposit of a coin by automatically sending a signal over the conventional telephone circuit corresponding to a dialed "0", also without requiring the deposit of a coin or the manual dialing of the "0".

BACKGROUND OF THE INVENTION

In the past coin controlled telephones have conventionally required the deposit of a nominal coin in order to dial an operator either to obtain or give information to a general purpose telephone operator or to dial a specific emergency number to obtain an emergency operator in order to notify the operator of the need for some specific emergency service, such as the summoning of aid in the case of an accident.

Some circuits have been proposed for bypassing the coin deposit circuitry to enable the dialing of an emergency number or the dialing of a general telephone operator; however, such circuits have not been widely accepted as the cost of the circuits generally has been prohibitive. Another chief drawback of such systems is that a distressed person seeking to place an emergency call may often dial the wrong emergency call number or even misdial the operator "0", so that placing of a call may be considerably delayed. In addition, a distressed person may not have the required coin available for deposit in the telephone. Thus, while the proposed emergency systems for bypassing the coin requirement have eliminated one of the drawbacks for the use of coin stations in emergencies, they have not adequately provided the availability of the telephone in the most essential cases. Many municipalities already have made available a special emergency operator who can be contacted by dialing a predetermined number, generally of fewer digits than a regular telephone number, for example a three digit number, such as "9-1-1", which has been adapted in many localities. Such as emergency operator generally is an employee of the municipality and is especially trained to send whatever emergency assistance is required as soon as a person has told the emergency operator the need of the occasion. Persons who have been incapacitated by an injury, blindness, or some other physical handicap, or possibly being in a state of trauma, often are unable to dial the number they are seeking to obtain.

Typical prior art U.S. Pat. Nos. are: 2,700,069 — Pharis et al., 2,791,634 — Lomax, 3,325,599 — Clark; and 3,406,256 — Strommen.

SUMMARY OF THE INVENTION

An object of the present invention is to provide an emergency circuit for a coin telephone station for connection of a caller to an emergency operator without prior deposit of a coin.

Another object of the present invention is to provide a simplified direct dialing of an emergency operator from a coin pay telephone station without the deposit of a coin and without requiring the manual dialing of a telephone number by the caller to obtain the emergency operator.

A further object of the present invention is to provide a circuit for an ordinary coin operated telephone station whereby a general purpose telephone operator can be summoned and a message transmitted to the operator without the deposit of a coin and without the manual dialing of the operator call number.

The present improved circuitry for automatically summoning an emergency operator and alternately summoning a general purpose telephone operator and communicating with either operator without the deposit of a coin prior to summoning the operator includes the provision of circuitry for automatically generating pulses and counting the pulses to provide the predetermined call numbers for either an emergency operator or a general purpose operator by simply alternately depressing an emergency operator push button or a general purpose operator push button.

In an automatic system according to this invention it is necessary to provide a certain predetermined time delay prior to the pulsing of the operator number for either the emergency or the general purpose operator, so as to assure a proper energizing of the telephone circuits between the central office and the pay station as well as the circuits of the emergency dialing circuit. In a usual telephone circuit from a pay station to a central station, each pay station normally is monitered by a central office and an electrical potential is applied between the conventional ring and ground connections when the path therebetween is completed by the deposit of the initial required coin. The ensuing flow of current in the telephone line alerts the central station to the proposed use of the pay station phone and dialing current is provided to the pay station system from the central station.

In order to bypass this coin alert energization requirement of a conventional pay station, it is necessary to provide for energization of the emergency dialing system so that the emergency operator or general purpose operator can be dialed without requiring the dialing of any other number by the standard dialing system. This energization of the system is provided by an initial delay enabling circuit which energizes the system solely for the purpose of calling an operator. In addition, the present system automatically dials either the emergency operator or the general purpose operator in response to the pressing of either the emergency or general purpose operator push buttons and provides for completion of the required digital signals for the respective push button which has been operated, regardless of what is subsequently done to the push button or to the regular dialing at the station involved. This is provided by a latching circuit which has inherent electrical connections which provide for the predetermined requisite dialing of the predetermined operator number, even if the push button is released and also if the push button should be repeatedly operated. This assures the dialing of the correct operator number regardless of the possible subsequent action of the person placing the call. It also prevents possible fraudulent misuse of the coin free operation of the pay station, such as has been possible with some prior circuits wherein it was necessary to dial the operator "0" by actually dialing the number "10" to obtain coin free response, as in some such circuits it is possible to stop the dial prior to the completion of the "10" digit signal and thereby obtain a complete dialing circuit to a private phone without the deposit of a coin.

The present circuit also includes circuitry for rapidly deenergizing the system once the phone has been hung up, so that the entire pay station is quickly restored to its normal condition for either pay phone operation or for another non-coin emergency call.

Further objects and advantages of this invention will be apparent from the following description referring to the accompanying drawings, and the features of novelty which characterize this invention will be pointed out with particularity in the claims appended to and forming a part of this specification.

DETAILED DESCRIPTION OF THE INVENTION

Figure 1:
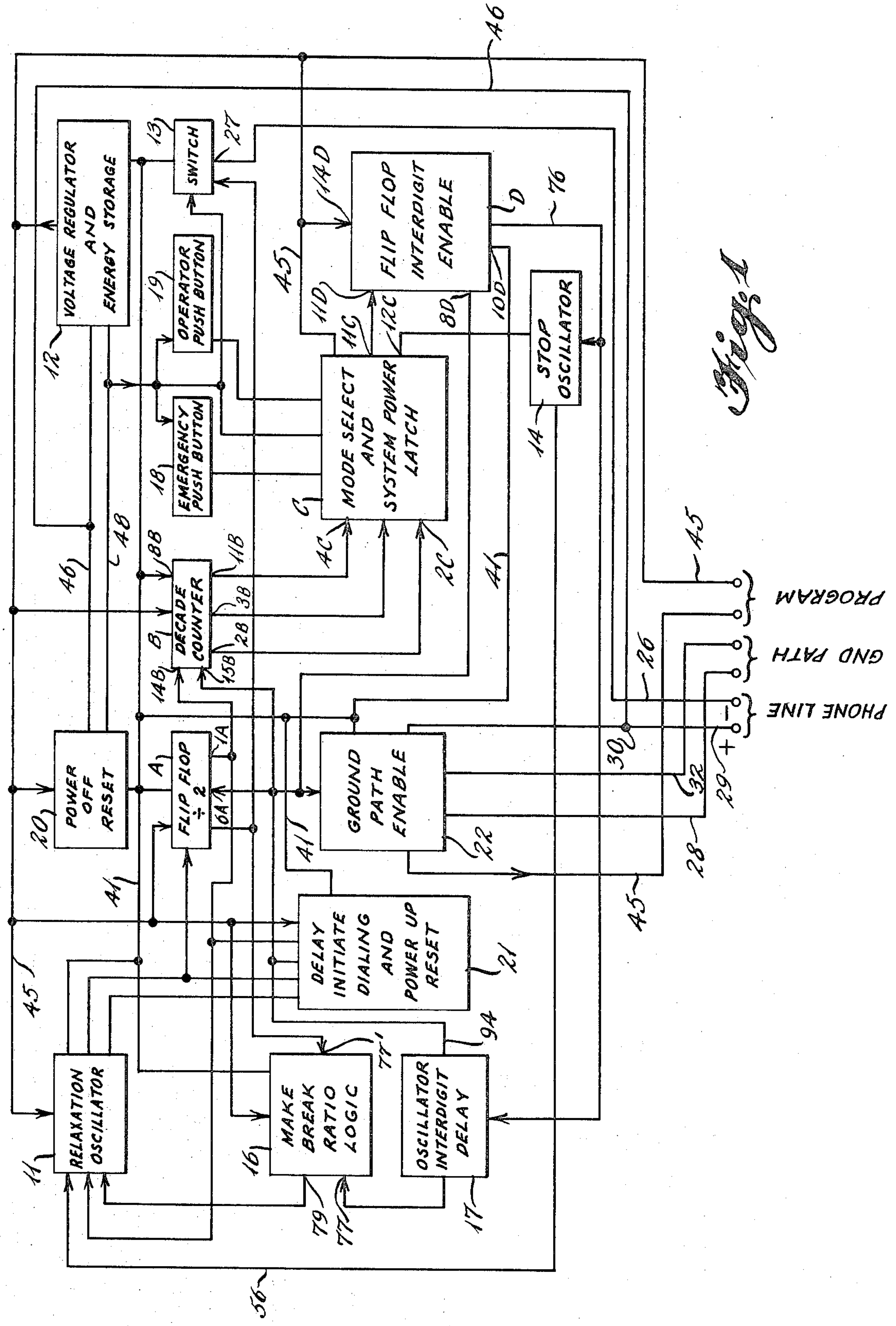
FIG. 1 is a logic diagram illustrating the major logical circuit units and their electrical interrelation to provide an emergency dialing system in accordance with the present invention.
Figure 2:
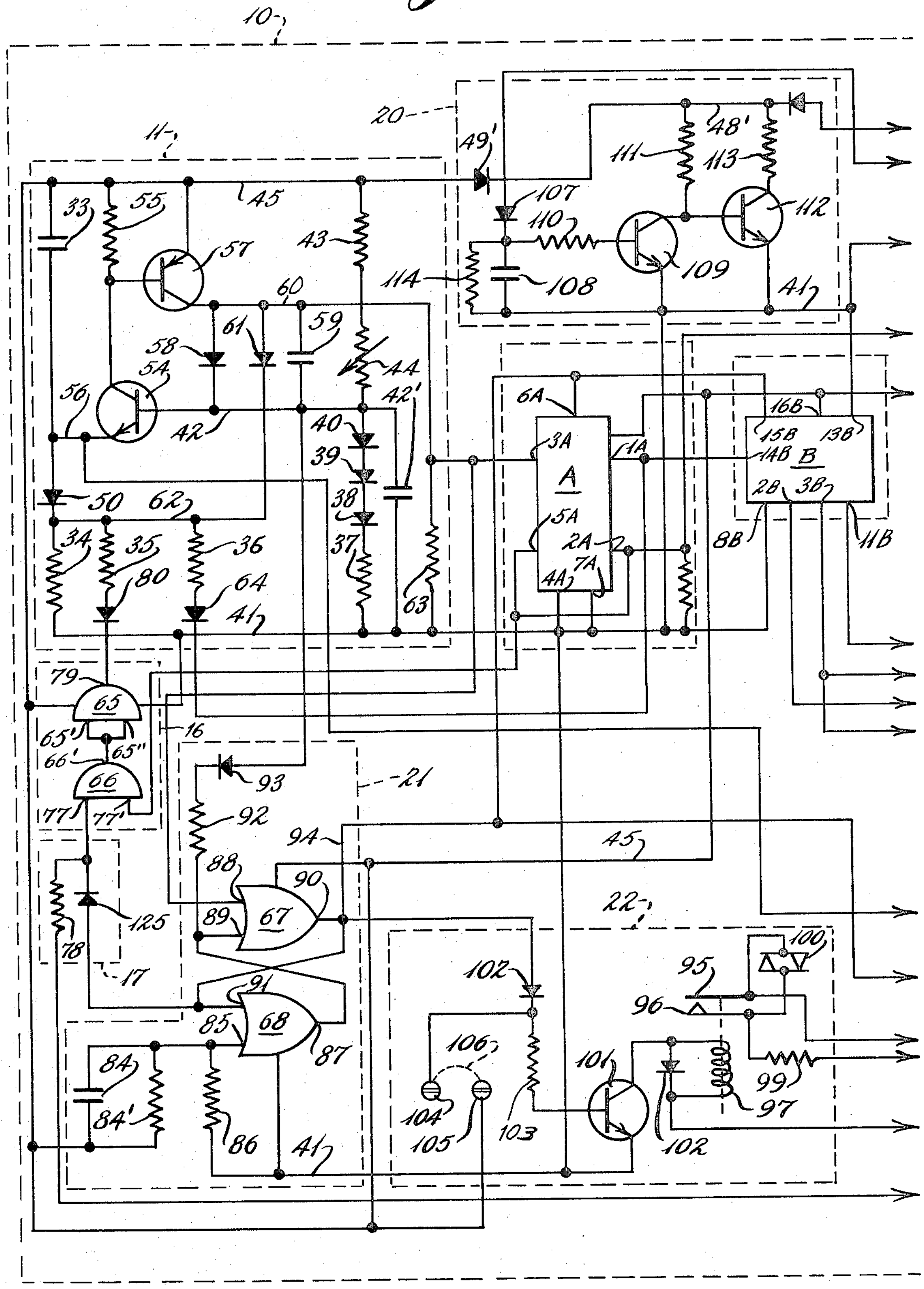
FIGS. 2 and **2*a* schematically illustrate two parts of an interconnected electrical circuit comprising an embodiment of the invention to provide the circuit logics shown in FIG. 1** as incorporated in the present invention.
Figure 2A:
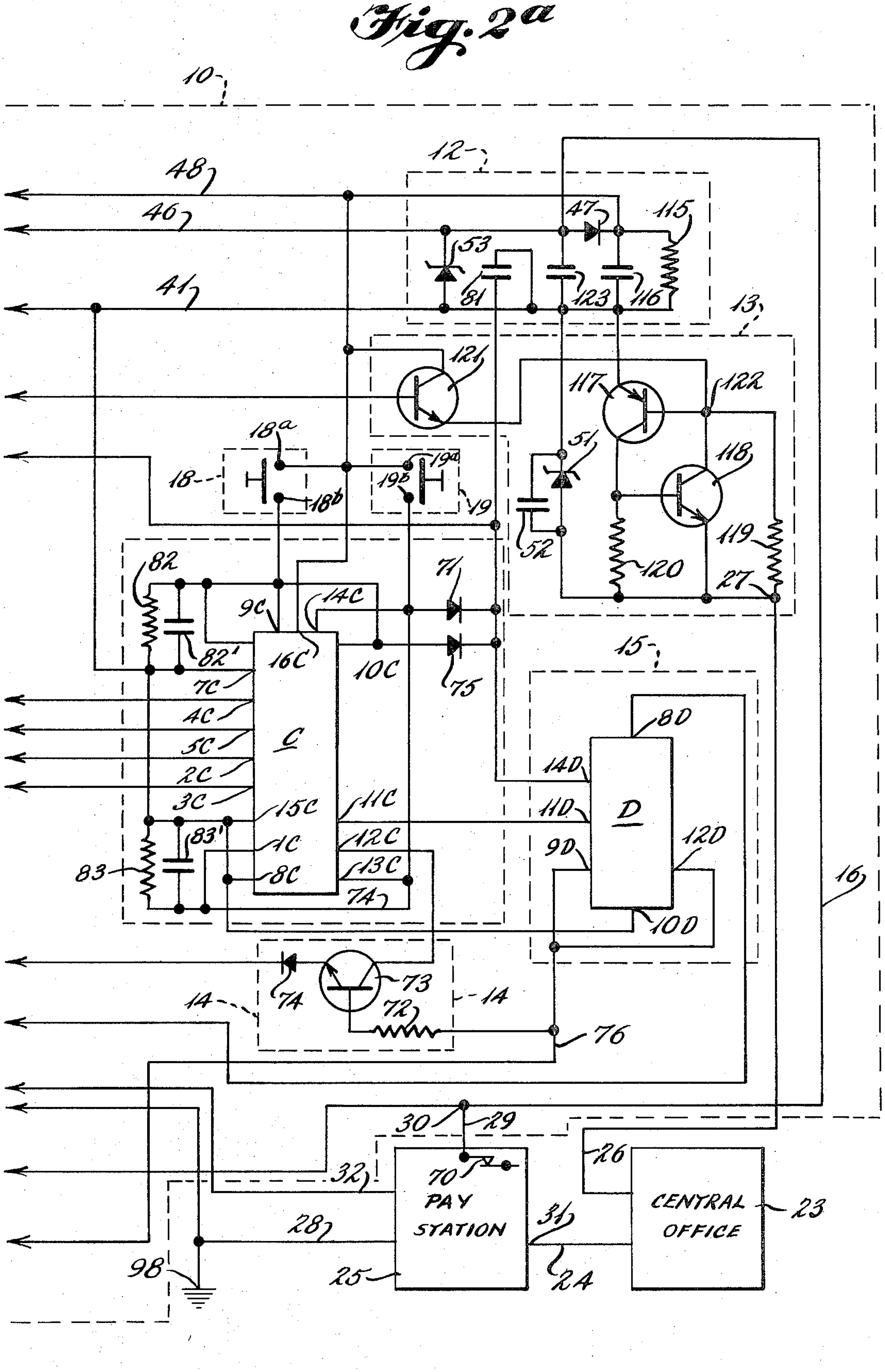

In a coin telephone system, the present invention may comprise a self-contained emergency signalling device 10 illustrated in block diagram form in FIG. 1 and in detailed circuitry in FIGS. 2 and **2*a*. Such a device 10 may conveniently be inserted in series between a central office and a conventional pay station circuitry either on the tip or ring side of the pay station with a suitable connection to ground. In most instances it will be found desirable to insert a suitable damping inductance between the device 10 and its ground connection in order to reduce the possible introduction of ground noise when the emergency system is put in operation. Where ground noise is not a problem, a suitable resistor, such as a thousand ohm resistance, may be connected in the circuit of the device which forms its connection to ground. Details of this circuitry will be explained in connection with the operation of the device 10.**

The present emergency signalling device comprises an auxiliary non-dialing means which may be considered as an automatic dialer and comprise primary four basic stations which, as illustrated in the drawings, include (1) an oscillator comprising two units forming a relaxation oscillator 11 and a divide-by-2 (÷2) flip-flop A, (2) a pulser which includes a voltage regulator and energy storage unit 12 and a switch unit 13, (3) a counter logic section which includes a mode select and system power latch C, a stop oscillator 14, a flip-flop interdigit enable unit 15, a make-break ratio logic unit 16, an oscillator interdigit delay unit 17, a decade counter B, an emergency manually operable circuit-closing means comprising an operator push button switch 18, and a general purpose operator push button switch 19, and (4) ancillary and protective circuitry comprising a power-off reset unit 20, a power-up reset and delay initiate dialing unit 21, a ground path enable unit 22, and the various electrical interconnections of these units.

As illustrated in FIGS. 2 and **2*a*, a central station 23 may be connected by a tip line 24 to a pay station 25 and by a ring line 26 to a terminal 27 of the emergency device 10. The pay station may comprise any conventional type of telephone pay station unit which normally has a ground line connection 28 and a line 29 connected to the central office ring line 26 in a conventional system, as through conventional switchhook switch 70 adapted to energize the phone circuit in response to placement of the phone in an operative position by removing the hand set from its switchhook. The pay station line 29 is connected to a terminal 30 of the emergency device 10. If it is found desirable to connect the emergency device in series between the central office and the pay station in the tip line of the system, the ring line 26 is connected directly to the pay station line 29, the central office tip line 24 would then be connected to the emergency device terminal 30, and the pay station tip line terminal 31 wound be connected to the emergency device terminal 27.**

In a conventional telephone system, the central office 23 may provide energizing power to the telephone circuit from a suitable power source at a predetermined operating voltage which conventionally is about 48 volts. A telephone line lying between a central office 23 and a customer's telephone, such as the pay station 25, may have an impedance of generally between 300 ohms and 3,000 ohms depending on a number of factors, such as the distance between the central office and the customer's telephone. The tip line 24 is normally the positive line of the system.

In "loop start" prepay pay station systems, the tip line is connected to earth ground at the central station via a dedicated pay station adaptor which is sensitive to line current in the tip line.

The ring line is connected to a −48 volt power source at the central station via the same pay station adaptor connected to the tip line. The adaptor is also sensitive to ring line current. The central office adaptor prohibits passing of dialing pulses until the tip line current and the ring line current is unbalanced by a predetermined amount. This tip ring unbalance is generated by connecting a 1,000 ohm resistance from pay station line 29 or 31 to earth ground. Once this is accomplished, dialing is enabled through the adaptor.

In "ground start" prepay pay station systems, the tip line is open circuited at the central station until current is detected in the ring line. When this ring line current is detected at the central station, a relay contact causes the tip line at the central station to be closed through the pay station adaptor to earth ground.

The ring line is connected to a −48 volt power source at the central station via the pay station adaptor. The ring line current is caused to flow to connecting 1,000 ohms resistance to earth ground at the pay station. Once tip connection is made at the central station, dialing may proceed. In the normal connection of the emergency signaling device 10 to a conventional pay station 25, the voltage between the emergency signaling device terminals 27 and 30 is a relatively small voltage, which may have an illustrative value of about 6 volts. When the emergency system is not in operation, as when either the emergency operator push button switch 18 or the general purpose operator push button switch 19 is not depressed, this 6 volt energization has no energizing effect upon the emergency device and therefore upon the telephone system in which it is connected.

In order to have the emergency device operable to connect a pay station telephone to an emergency operator or to a general purpose operator simply by depressing respectively either the push button switch 18 or the push switch 19, it is necessary that the emergency device automatically provide energizing signal pulses to the central station corresponding to predetermined conventional digital dialing pulses, such that the central office equipment will automatically recognize the emergency pulses as the digits for signalling the desired operator. Such dialing pulses are provided in the present emergency device by the oscillator which includes circuitry to provide a conventional basic timing for the digital pulse of 10 pulses per second, with a 60 percent break, 40 percent make dial pulsing ratio and a 600 millisecond minimum interdigit time between numbers dialed, which is required for digit recognition by conventional central office number interrogation equipment. The basic timing of the pulses is provided by the relaxation oscillator 11 in which a capacitor 33 forms the basic timing unit and is initially discharged, that is, it is at zero voltage when the emergency device is not in use. The timing capacitor 33 is adapted to be charged by charging paths provided by combinations which include resistors 34, 35, and 36 in different circuits, as will be explained hereinafter. The timing of the relaxation oscillator 11 is controllable by a voltage divider circuit comprising a fixed resistor 37 connected in series with diodes 38, 39, and 40 between line 41 and line 42, and a fixed resistor 43 in series with a variable resistor 44 connected in series between line 42 and line 45.

When either push button 18 or push button 19 is depressed closing the circuit between their respective contacts 18*a* and 18*b*, and 19*a* and 19*b*, voltage is applied to line 45 directly from the emergency device terminal 30 through line 46, diode 47, line 48, integrated circuit C input pin 16C, output pin 14C or 10C, diodes 71 and 75, and line 45 to one side of the main timing capacitor 33. The other side of the capacitor 33 is connected through a diode 50 and the fixed resistor 34 to line 41, which connects to the emergency device terminal 27 through a zener diode 51.

A discharge voltage protective capacitor 52 is connected across the terminals of zener diode 51 and a second zener diode 53 is connected between line 45 and line 41 so as to regulate the voltage between these lines and maintain it at a suitable operating value, such as 6 volts. The relaxation oscillator includes a transistor 54 with its base connected to the voltage divider connection to line 42 and its collector-emitter path connected in series with a fixed resistor 55 through which it is connected to line 45. The other side of the transistor 54 collector-emitter path is connected to line 56 which is connected to the side of the timing capacitor 33 connected to diode 50. In this manner the transistor 54 collector-emitter path and resistor 55 are connected directly across the timing capacitor 33. The relaxation oscillator also includes another transistor 57 the base of which is connected to the connection of the resistor 55 to the transistor 54 collector. The transistor 57 collector-emitter path is connected between line 45 and line 42 through a diode 58 and a capacitor 59.

When the system is not in operation, the voltage on line 56 is the same as the voltage on line 45, and, when one of the push buttons 18 or 19 is depressed so that voltage is impressed on line 45 and capacitor 33 begins to charge, the voltage on line 56 decreases exponentially such that the transistor 54 begins to conduct from its base to its emitter. When this occurs, current begins to flow through transistor 54 in its collector-emitter circuit thereby causing a voltage drop across resistor 55. When the voltage across the resistor 55 reaches a predetermined value, which for illustrative purposes may be 0.6 volts, transistor 57 becomes conductive in its collector-emitter circuit from line 45 to its terminal connected to line 60. This current through the transistor 57 flows through diode 58 to line 42 and to the base of transistor 54 thereby rendering the collector-emitter circuit of transistor 54 more conductive and producing a regenerative action therethrough. This provides a relatively low resistance bypass through the resistor 55 and the transistor 54 collector-emitter circuit across the timing capacitor 33, causing the capacitor 33 to be discharged to a point where the voltage between line 45 and line 56 is reduced to a predetermined value, for example, less than one volt, and the voltage from line 45 to line 60 is reduced to another predetermined value, for example, less than 0.5 volts.

The current through the transistor 57 collector-emitter path also flows through a diode 61 which is connected between line 60 and a line 62, which forms a common connection to the three resistors 34, 35, and 36. This circuit through the diode 61 provides a bypass through the three resistors 34, 35, and 36 around the diode 50 while the transistors 54 and 57 are discharging the timing capacitor 33. After the capacitor 33 has been discharged, the transistor 54 collector current approaches zero so that the drop across resistor 55 is correspondingly reduced to substantially zero, thereby causing the transistor 57 to become non-conductive, thus completing the regenerative action of the oscillator and returning both of the transistors 54 and 57 to non-conductive state. When this occurs, the capacitor 33 again charges to a point where the transistor 54 again becomes conductive, and the previously described discharge cycle is repeated, thus providing a predetermined timing by the relaxation oscillator. It has been found desirable to add a capacitor 59 connected between lines 60 and 42, as the charging and discharging of this capacitor in the previously mentioned timing cycle decreases the pulse rise time to line 60 of the oscillator.

During the time that the transistor 57 is non-conductive, it is desirable that its collector voltage should be held at or near the voltage of line 41. In order to do this, a fixed resistor 63 is connected between line 60 and line 41 and provides a collector load for the transistor 57 collector, so that when no current flows through the collector and the resistor 63, the collector voltage assumes substantially the voltage of line 41. The diode 50 which is connected between the transistor 54 emitter and line 62 provides a DC decoupling of line 62 from line 56, thereby allowing the voltage of line 62 to become more positive than line 56 while preventing the flow of current from line 62 to line 56. The three diodes 38, 39, and 40, connected in series with the resistors of the voltage divider across the relaxation oscillator, function as temperature compensating diodes and improve the frequency stability with changes in temperature. A capacitor 42' is connected across the voltage divider branch between lines 42 and 41 to minimize effects of transients on the operation of transistors 54 and 57.

In order to provide the desired predetermined emergency digital signal pulses to the central office corresponding to digital signal pulses which would be sent from the pay station by a conventional dialing of the digits for a desired telephone number, such as the emergency number 9–1–1 or "0" for the operator, pulses are generated by a pulse generating circuit comprising the oscillator and these pulses must be counted and a suitable delay interposed between the pulses for each desired digit, so that the central station will recognize the pulsed digit sent by the automatic emergency dialer of this invention. The counting of the pulses may be done by any suitable counter B, such as a decade counter provided by a digital integrated circuit of the COS/MOS decade counter type CD4017A, as disclosed in the RCA Bulletin, File No. 479, Digital Integrated Circuits CD4000A Series, page 44. Since this counter does not form a part of the present invention, details of the counter will not be explained. Except as they may be used in carrying out the present invention. In order to facilitate reference to the counter disclosed in detail in the foregoing bulletin, the reference numerals to the various connection of the decade counter B in the present device will correspond to the reference numerals used in the counter illustrated in the bulletin. In the present drawings, the reference numerals will carry the number in the bulletin and the reference letter B to designate that it is a connection to the decade counter B.

In order to initiate operation of the present emergency push button dialing system without requiring a deposit of a coin in a coin operated pay station telephone, it is necessary that the pay station emergency device provide for activating or energizing the telephone lines between the pay station and the central office circuitry. In a conventional pay station telephone system, this activation of the telephone circuit is made when the initial coin is deposited so as to operate a circuit which provides a suitable ground for the energizing of the telephone system. In addition, it is required that the circuitry of the emergency signalling device of this invention be reset to an initial starting condition after each complete operation thereof so as to assure the proper signalling of the predetermined digits to the central office whenever the emergency device is utilized. Both the coin operated pay station ground path enable circuitry and the resetting circuitry of the emergency device may be provided by ancillary circuitry which does not directly form a part of the digital pulsing, counting, and switching circuitry.

A pair of gates 67 and 68 which may conveniently comprise two gates of a four-gate integrated circuit, such as a COS/MOS NOR Gate CD4001A, as described in the previously mentioned RCA Bulletin, pages 3–6, may be used as a cross-coupled latch circuit to provide a predictable run-on reset condition for all of the logic elements of the emergency device 10. Before power is applied to the emergency device, a capacitor 84 connected between line 45 and input 85 to gate 68 is completely discharged, that is, it has 0 volts across it. This is assured by a resistor 84' connected directly across capacitor 84. When either of the emergency push button switches 18 or 19 is pushed, power is applied to a condenser 84, the oscillator 11, and the counting logic of the device through a control gate C. The gate 68 input 85 is connected through a resistor 86 to line 41 and initially assumes a logical "1" state until the charging current through resistor 86 flowing to the condenser 84, charges the condenser 84 to a voltage such that the voltage on input 85 of gate 68 is 10 percent of the biasing voltage between lines 41 and 45. This initial logical "1" state on gate 68 input 85 causes the gate 68 output 87 to have a logical "0" state.

The initial logical "0" state on both inputs 88 and 89 of gate 67 causes the gate 67 output 90 to assume a logical "1" state. As shown, the output 87 of gate 68 is cross-connected to gate 67 input 89 and the output of gate 67 is cross-connected to input 91 of gate 68. This condition exists until the first oscillator pulse on oscillator 11 line 60 is impressed on gate 67 input 88. Such an oscillator pulse on input 88 places this input in the logical "1" state, which causes the gate 67 output 90 to go to a logical "0" state, which, in turn, due to its connection to gate 68 input 91, places this input in the "0" state, and causes gate 68 output 87 to go to the logical "1" state. Thus, the first pulse from the oscillator 11 on line 60 latches gate 67 output 90 in the logical "0" state for the remainder of the "dialing" or digital signalling cycle.

A resistor 92 provides a current path in parallel with the resistor 37 when the cross-coupled gate 67–68 latching circuit is initially reset. This parallel current path lowers the voltage on the oscillator line 42, thereby increasing the time required for charging the main timing capacitor 33 to the threshold voltage of the oscillator transistor 54. This increased charging time of the capacitor 33 provides an initial delay time which allows the system to stabilize after one of the buttons 18 or 19 has been pushed and before the automatic "dialing" actually begins. A diode 93 is connected between oscillator line 42 and resistor 92, so as to decouple the resistor 92 from the oscillator after the first oscillator pulse appears on line 60.

With the gates 67 and 68 latched with the output 90 of gate 67 in the "1" state prior to the actual operation of the "dialing" cycle of the emergency device, the resetting of the various logic circuit units may conveniently be accomplished in response to the initial closure of the push button 18 or 19. This is accomplished by connecting gate 67 output 90 through a reset line 94 to a reset terminal 6A of flip-flop A, a reset terminal 15B of decade counter B, and terminal 8D of flip-flop D and through a diode 125 to input 77 of gate 66. Thus all of the counter logic and the oscillator flip-flop A are similarly initially reset to the same state.

Concurrently with the resetting of the logic of the emergency device, the pay station coin operated energizing ground enable path is bypassed to provide for operation of the emergency device without the deposit of a coin in the pay station. This bypass is provided by a relay having contacts 95 and 96 which are adapted to be closed by a relay coil 97, so as to close a circuit to ground 98, around the conventional pay station coin-operated ground enable circuitry, in response to the pushing of one of the emergency device push button switches 18 or 19. A current limiting resistor 99 is connected in this relay grounding circuit so as to limit the maximum current therethrough to a predetermined safe value. Preferably, a varistor 100 is connected across the relay contacts 95–96, so as to suppress interference which may be caused by the operation of this relay.

When the previously described gate 67 output 90 goes to the logical "1" state and is latched in this state, the relay coil 97 is energized through a transistor 101 when either of the emergency push buttons 18 or 19 is pushed, as under these conditions the gate 67 output 90 initially is in the logical "1" state and this positive voltage is impressed on diode 102 connected in series with a current limiting resistor 103 in series with the base of the transistor 101. This provides a base driving current for the base of the transistor 101, which renders the transistor collector-emitter circuit conductive, and provides for the flow of energizing current through the relay coil 97 from the pay station line 29, energized from the telephone tip line, through coil 97, transistor 101, to line 41, and returns through the telephone ring line 26 to the central station. Energization of the relay coil 97 closes the ground enable paths through relay contacts 95 and 96 thereby bypassing pay station coin operated ground enable path and permitting the energization of the remainder of the emergency signalling device 10. A diode 102 is connected across the relay coil 97 so as to protect the transistor 101 against switching transients which may be produced by the relay coil 97.

In certain telephone systems, the ground current can be removed when the actual dialing begins. In other systems the ground current must be maintained throughout the call. In order to provide for both of these systems, terminals 104 and 105 are provided which are adapted to be connected together by a suitable jumper 106. In the system which requires that the ground current be maintained throughout the call, terminal 104 is connected to transistor 101 base drive circuit between the diode 102 and the current limiting resistor 103, and the terminal 105 is connected to line 45. With this type of connection, the transistor 101 remains conductive, and therefore the relay coil 97 remains energized as long as push button 18 or 19 has been pushed and a positive biasing voltage and telephone loop current exist in the system. The diode 102 provides a DC decoupling of the system reset line 94 from the transistor 101 base driving circuit when this circuit is energized through the jumper 106.

When telephone line current flows through the telephone lines, even before the automatic "dialing" is initiated, a diode 107 in the power-off reset unit 20 is forward biasing by being connected through line 46 to the pay station line 29, and, through a switch hook switch 70 to the telephone tip line 24, when the telephone is removed from its hook. This impresses a charging voltage on a capacitor 108 in this reset unit, which, when charged to a sufficiently high voltage, provides a base drive for the base of a transistor 109 through a current limiting resistor 110. This renders conductive the collector-emitter circuit of the transistor 109 causing a current path through a biasing resistor 111 connected between line 48' and the base of a transistor 112. Before the transistor 109 is thus rendered conductive, the base of the transistor 112 is biased to substantially the voltage of line 48', so that the transistor 112 is thereby rendered conductive and current flows through its collector-emitter circuit and a current limiting resistor 113. When the transistor 109 is rendered conductive and current flows through resistor 111, the base of the transistor 112 is no longer biased to a sufficiently high voltage, and its voltage is substantially reduced to that of its emitter, so that the transistor 112 is rendered non-conductive. When a party using the pay station telephone places the phone in non-operative position, as by hanging up the phone, so that loop current in the telephone system ceases, the voltage on line 46 is removed by the opening of the switch hook switch 70 in the pay station, and the voltage of line 46 is reduced to zero with reference to line 41. The diode 107 decouples capacitor 108 from line 46 and the resistor 114 provides a discharge path for capacitor 108. Simultaneously therewith, a similar resistor 115 provides a discharge path under these conditions for a capacitor 116 in the pulser voltage regulator and energy storage unit 12. The transistor 109 is held in the conductive state until the capacitor 108 is sufficiently discharged to starve the base drive current from the base of the transistor 109. After this occurs, the transistor 109 is rendered non-conductive, and the resistor 111 provides a base drive voltage connection for the base of transistor 112 which renders the transistor 112 conductive. The resistor 113 connected in the collector-emitter circuit of transistor 112 is a relatively low resistance and thereby provides for a relatively rapid discharge of capacitor 81 and 116. This quickly places the emergency automatic signalling device 10 in a completely discharged state after the telephone in the pay station is hung up. In addition, the time constant of the resistor 114 and the capacitor 108 is such that the predetermined 60 millisecond "break" period required for digital signalling of the central office does not cause the transistor 109 to become non-conductive thereby precluding automatic shutdown of the emergency signalling device during the transmittal of the automatic digital signalling pulses from the pay station to the central office.

In order to provide the 60 percent break and 40 percent make ratio conventionally used to indicate the digital dialing pulses, the oscillator is provided with circuitry which causes the pulse rate of the oscillator 11 to change every half cycle. This is obtained by a feedback circuitry provided by a flip-flop A, which may conveniently be one of the flip-flops of a dual "D" type toggle configuration flip-flop as provided by an integrated circuit, such as that described in the foregoing RCA bulletin, page 30, as a CD4013A type. The reference numerals in this disclosure to the connections of the flip-flop A will carry the same numbers as corresponding connections of the flip-flop in the above mentioned bulletin with the addition of the letter A after the number, so as to identify the connection as being made to flip-flop A in the present drawings. The other flip-flop of this dual "D" type unit is utilized in another part of the present circuitry, as will be explained later.

The logical circuitry of the flip-flop A is such that by connecting the oscillator 11 output line 60 to the flip-flop input connection 3A, the output frequency at the flip-flop output connection 1A is half the frequency of the input clock pulses to the flip-flop A such that this flip-flop may be considered a "divide by 2" (÷ 2) flip-flop. The flip-flop outputs 1A and 2A, which are complementary to each other, are independent of the input to the flip-flop as long as the reset connection 6A is at a high voltage. This reset voltage is provided by reset circuitry in the reset unit 21, which provides a resetting voltage for various of the integrated circuits of the present device.

For the present description, a high (positive) voltage is the "1" state and a low (zero or negative) voltage is the "0" state of a line or connection. When the voltage on the reset connection 6A is low, the states of the output connections 1A and 2A reverse every time the voltage on the input connection 3A from the oscillator 11 changes from a "0" state (zero volts) to a "1" state (line 45 voltage). Flip-flop output connection 1A is connected to the oscillator 11 by a feedback circuit including the resistor 36 and diode 64, such that when the flip-flop output 1A is in the "1" state, no current flows through the reverse biased diode 64. However, when the flip-flop output 1A is in the "0" state, the resistor 36 becomes a charging path for capacitor 33 in parallel with the permanently connected capacitor charging path through resistor 34. This occurs only during the dialing 60 millisecond "break" period of a dial pulse.

The ÷ 2 flip-flop as shown in FIG. 2 actually operates as part of the oscillator in the present system in that its outputs 1A and 2A are both fed back to the relaxation oscillator circuitry. The output 2A is fed back to the relaxation oscillator through logic gates 65 and 66 similar to the output 1A, except that its effect is inhibited at the beginning and end of the pulsing sequence. This inhibit function will be discussed later in greater detail. The two logic gates 65 and 66 may conveniently comprise two gates of an integrated circuit such as is provided by a COS/MOS NOR gate, of which the CD 4001A type described in the previously mentioned RCA bulletin, pages 1–6, is a practical embodiment. Only two of the gates of this quadruple integrated circuit gate are used as gates 65 and 66, while the other two gates are used for other purposes which will be described later.

The required conventional make/break digital pulse timing required by telephone central office equipment of 40 milliseconds/60 milliseconds timing is obtained by the charging time of the capacitor 33 by resistor 34 in parallel with resistor 35, and resistor 34 in parallel with resistor 36. The required time lapse or interdigit time between the different digits pulse from the pay station to the central office is generated by the charging time for the capacitor 33 generated by charging this capacitor through resistor 34 alone. This charging circuit produces an interdigit time of a minimum of 600 milliseconds.

In order to obtain these different desired pulse timings and in order to provide the desired digital counting of pulses sent to the central office equipment from the pay station, a counter logic circuitry is provided which controls the sending of the digital pulses by the device comprising the present invention. This counter logic circuitry comprises four major components including (1) the decade counter B, (2) a code or AND-OR select gate which may conveniently comprise a COS/MOS Quad integrated circuit C of the CD4019A type described in the previously mentioned RCA bulletin, pages 50–52, (3) a flip-flop D which conveniently may comprise the second flip-flop of an integrated circuit of the dual "D"-type of which the " 2 flip-flop A comprises the other flip-flop of this integrated circuit unit, and (4) miscellaneous discrete gating components comprising four gates, two of which are gates 65 and 66 previously mentioned and two gates 67 and 68 which form part of an integrated circuit, as previously defined with reference to gates 65 and 66.

The ÷ 2 flip-flop A provides an output to its terminal 1A which not only is fed back to the relaxation oscillator as previously described, but is also connected to the decade counter B input terminal 14B to provide a clock pulse which is counted by this counter. Initially, a logical "1" on decade counter reset terminal 15B causes counter output terminal 3B to be a logical "1" and all other counter outputs of terminals 2B and 11B to be logical "0". When reset terminal 15B is logical "0", counting by the counter B is enabled. Each time the oscillator circuit output 1A goes to a logical "1" state, the counter indexes to the succeeding count, and the logical "1" output propagates to the next successive output terminal of the decade counter B, in the conventional manner in which this type counter operates.

When the emergency signal is selected by pushing either push button switch 18 or 19 for selectively counting and transmitting one of the two predetermined sets of digit signal pulses, either for the "0" operator or the "9–1–1" emergency operator, the counter outputs on its terminal 2B, 3B, and 11B are fed to inputs of the AND/OR Select gate C to be interrogated thereby. This Select gate C functions to select a predetermined operating mode and latches the system for generating a predetermined set of digit signal pulses. In operation of the present emergency signalling device, if the operator "0" push button 19 has been pushed closed, gate C terminals 14C, 1C, and 13C would be biased to a logical "1" state. Once the gate C output 13C has been set to a logical "1" state, its feedback connection through line 74 to gate terminal 1C will latch or hold the gate terminal 13C in a "1" state until the supply voltage, as by hang-up of the pay station phone and consequent opening of switch hook switches 69 and 70, is reduced to less than 3 volts when the phone is thus placed in the non-operative position. The gate C output 13C provides the biasing current for the entire logic circuit through diode 71 to line 45. It is this latching circuitry provided by the connections through the gate terminals 1C and 13C which allows the push button 19 to be pushed and held released, or pushed repeatedly without causing any effect on the digital pulsing process, from the emergency digital dialing device to the central office equipment, once it has been place in operation.

When the gate C output 13C is a logical "1", the gate output terminals 11C, 12C, and 10C are logical "1" only when the gate C inputs to its terminals 5C, 3C, and 7C are logical "1". With gate output 13C at logical "1", the decade counter B counts the clock pulses from the ÷ 2 output until the decade counter output 3B becomes logical "1". When this occurs, gate C output 11C and 12C both go to logical "1" states. When gate terminal 11C goes to a logic "1" state, its connection to flip-flop D input 11D toggles flip-flop D output 12D, which formerly was in the logical "0" state, to a logical "1" state.

This flip-flop D output 12D is connected through a current limiting resistor 72 to the base of a transistor 73, which, with a diode 74 to which the transistor 73 emitter is connected, forms a signal stop oscillator. The collector of the transistor 73 is connected to output 12C of the gate C, so that when the gate C output 12C goes to a logical "1" state, it provides collector current to the transistor 73. Thus, when the flip-flop D output 12D goes to the logical "1" state, it biases the transistor 73 base to a positive voltage, and makes the transistor 73 conductive, so that current flows through the diode 74 to line 56 of oscillator 11. This raises the voltage on line 56, so that the oscillator transistor 54 cannot be rendered conductive and the oscillator 11 cannot be triggered. This stops operation of the oscillator 11.

When emergency push button switch 18 is pushed, it provides circuit closure through its contacts 18*a* and 18*b*, impresses the voltage of line 48 on gate C inputs 16C, 9C, and 10C, thereby forcing these gate terminals to the logical "1" state, and the interconnection of the terminals 10C and 16C provide for latching these in the logical "1" state, even though the push button 18 may subsequently be released, or repeatedly opened and depressed. This circuit interconnection provides the desired latching because of the internal inherent electrical characteristics of the gate C.

When the gate C terminal 10C is a logical "1", energization of the logic circuitry flows through a diode 75 connecting the terminal 10C to line 45. This energization will be approximately 5 volts. When push button 18 is closed so that gate terminal 10C becomes logical "1", the gate terminals 11C and 12C will follow the logic inputs on gate terminals 4C and 2C, respectively, which are connected to terminals 11B and 2B of decade counter B. Gate terminal 4C goes to logical "1" at the end of the ninth "break" pulse, thereby causing terminal 11C to go to a logical "1" and causing flip-flop B output 12D to go to a logical "1" state. As previously described, when flip-flop terminal 12D goes to the logical "1" state, it biases the base of stop oscillator transistor 73 causing base current to flow. This transistor 73 base current will only flow to the transistor 73 collector and to gate C terminal 12C, since this terminal is at a logical " 0" state under these conditions. Simultaneously, when flip-flop terminal 12D goes to the logical "1" state, its connection through line 76 to gate 66 input 77 through a current limiting resistor 78, causes the gate input 77 to be biased to the logical "1" state, so that the gate 65 output 79 assumes a logical "1" state. This inhibits the passage of current through the condenser 33 charging resistance 35, because of the reverse-biased diode 80 connected between the resistance 35 and the gate 65 output 79. Likewise under these conditions, flip-flop output 1A is in the logical "1" state, so that the reverse-biased diode 64 prevents the flow of current through the capacitor 33 charging resistance 36. This leaves the resistor 34 as the only charging path for the timing capacitor 33, thereby providing for the slow rate of charge of the capacitor 33. This gives the desired 600 millisecond minimum interdigit time required by the telephone central office equipment between the pulses signaling the central station for the digit 9 and the subsequent digit 1.

After the passage of the interdigit time, the next oscillator output pulse changes the state of output 1A to a logical "0". The diode 64 is conductive for this state of output 1A and places the circuit through resistor 36 in parallel with resistor 37 for a 60 millisecond "break" time, which results in the transmittal or dialing of a "1" to the central office. The next oscillator output pulse produces a second interdigit time for a minimum of 600 milliseconds, and the succeeding oscillator output pulse again results in the transmittal of a second "1" digit to the central office. At the end of the second "1" digit, the decade counter B output 2B goes to a logical "1" state, which is transmitted to its connection to terminal 2C of gate C, which the circuitry of the gate C causes its terminal 12C to go to a logical "1". This impresses a bias voltage on the collector of the stop oscillator transistor 73, which allows the transistor 73 emitter to follow the bias of the flip-flop D output 12D, so that a positive bias passes through the stop oscillator diode 74 and is impressed on line 56 of oscillator 11. This shuts down the oscillator as was previously explained with reference to shutting down of the oscillator at the end of the transmittal of the "0" signal when the operator button 19 had been pushed.

The stop oscillator diode 74 is required to prevent reverse bias breakdown of the transistor 73 from its emitter to its base when the flip-flop D terminal 9D is a logical "1" and the gate C terminal 12C is a logical "0".

When flip-flop D output 12D goes to a logical "1" state, its connection through current limiting resistor 78 to input 77 of gate 66 causes this input to go to a logical "1" state. Since this gate is an OR gate, when either of its inputs 77 and 77′ are logical "1", its output 66′ will be logical "0". Gate 66 output 66′ is connected to both inputs 65′ and 65″ of gate 65, so that a logical "0" on gate output 66′ places gate inputs 65′ and 65″ at a logical "0". This results in a logical "1" on gate 65 output 79, which inhibits flow of current through resistor 35 and prevents its affecting the charge rate of the main timing capacitor 33 because of the decoupling by diode 80. Resistor 36 also is decoupled by diode 64 so that it is effective only when the ÷ 2 flip-flop output 1A is a logical "0".

In order to prevent possible false signalling due to alternating current peaks in the system, a capacitor 81 is connected across lines 41 and 45 and provides an AC filter for pulses which may be generated during logical switching in the system. Further, in order to maintain a logical "0" state on gate C terminals 10C and 13C until one of the push button switches 18 or 19 is pushed, resistors 82 and 83 are respectively connected between the gate terminals 10C and 13C to line 41. These two resistors provide current sinking for the input gate terminals 6C and 1C, respectively. Capacitors 82′ and 83′ are respectively connected across resistors 82 and 83 in order to expedite this current sinking function of resistors 82 and 83. These two resistors are necessary in order to maintain a logical "0" state for terminals 10C and 13C, connected respectively through diodes 75 and 71 to line 45, until one of the push button switches 18 or 19 has been pushed.

The pulsing circuit operates for each pulse of a digital signal and comprises a transistor pair formed by a PNP transistor 117 and an NPN transistor 118 connected such that they are normally ON for a conductive state, that is, they are saturated similar to an SCR in the ON (conductive) state. The pulsing circuit also includes resistors 119 and 120 connected to line 26 terminal 27 in the switch unit 13 and respectively to the bases of the transistors 117 and 118. In addition, the collector of transistor 117 is connected to the base of transistor 118 and the collector of transistor 118 is connected to the base of transistor 117. The oscillator ÷ 2 flip-flop A output 2A is connected so as to control the operation of the pulser switch formed by the transistors 117 and 118 and is connected to the base of transistor 117 through an amplifier line transistor 121. This connection is formed by directly connecting the ÷ 2 flip-flop A output 2A to the base of transistor 121 and connecting the collector of transistor 121 to line 48 with the emitter of transistor 121 connected to the base of the pulser switch transistor 117. When the emergency unit is not in operation, the oscillator ÷ 2 flip-flop A output 2A is in a logical "0" state. When this logical "0" is impressed on the base of transistor 121, this transistor is non-conductive and no current flows through this transistor. The base of transistor 117, when the oscillator ÷ 2 flip-flop A output 2A goes to the logical "1" state, as previously described, biases the base of transistor 121 so that this transistor becomes conductive and reverse biases the base of transistor 117 with current flowing through the resistor 119 to the telephone ring line 26. When the logical state of the ± 2 flip-flop A output 2A is returned to a "0" logical level, the current flowing through resistor 119 provides the forward bias on transistor 117. Base current increases until the transistor 117 is rendered conductive and current begins to flow through the transistor 117 collector-emitter circuit. This current flows through resistor 120 to the telephone ring line 26 and produces a voltage drop across the resistor 120. When this resistor 120 voltage drop reaches approximately 0.6 volts, it produces a sufficient bias on the base of transistor 118 to render the collector-emitter circuit of transistor 118 conductive and causes current to flow through this circuit of transistor 118. The collector-emitter circuit of transistor 118 is thus in parallel with resistor 119 and the collector-current of transistor 118 becomes a large part of the base current of transistor 117 as the resistance of transistor 118 collector-emitter circuit is substantially a short circuit across the resistor 119. When this occurs, the transistor pair 117–118 latch into an ON (saturated) state. The total voltage drop from line 41 to the telephone ring line terminal 27 then becomes approximately 0.7 volts when the transistors 117 and 118 both are in this conductive or saturated state.

In the operation of the pulser switch circuitry 13, when the ÷ 2 flip-flop A output 2A goes to a logical "1" state, the connection 122 of the emitter of transistor 121 to the base of transistor 117 and to the collector of transistor 118 follows the voltage of flip-flop output 2A within 1 volt. The current through the emitter of transistor 121 which is required to raise the voltage of connection 122 to a logical "1" state initially is equal to the loop current of the phone line which has been used. As the connection 122 is driven positive, the bias thereof on the base of transistor 117 turns off (renders non-conductive) this transistor because of the lack of current for its base. With no collector current going through the transistor 117, the voltage drop across resistor 120 is reduced substantially to zero so that the voltage bias on the base of transistor 118 is insufficient to keep transistor 118 in the conductive state, and it also is then turned off. The current required to hold the transistor 117 turned off is the current flowing through resistor 119. In a conventional telephone line, this current is 48 volts divided by the resistance of the resistor 119, which resistance is one megohm; that is, this current is 48 micro-amperes. The condenser 116, which is connected between the collector of transistor 121 and the emitter of transistor 117, has a capacitance capable of supplying this 48 micro-amperes for the 60 milliseconds "break" time of the pulsing circuit. At the end of the 60 milliseconds "break" time, output 2A returns to a logical "0" state, thereby allowing transistor 117 base current to flow through resistor 119. As this occurs, transistor 117 becomes conductive, and its collector-emitter current flows through resistor 120, so that the voltage drop across this resistor again increases and provides a sufficiently high bias on the base of transistor 118 so as to turn on (render conductive) transistor 118. When this occurs, both transistors 117 and 118 again saturate and a "make" period exists. The capacitor 52, connected between terminal 27 and line 41, functions to provide the desired shape to the pulse provided by the pulser circuit and also limits the rise and fall time of the pulse, similar to conventional mechanical pulsing contact shaping circuits. The diode 51 connected across capacitor 52 is a zener diode which functions as a transient suppressor, an over-voltage protector, and a reverse voltage protector, which maintains the voltage across the transistors 117 and 118 within allowable safe limits.

A capacitor 123 is connected between lines 41 and 46 to provide AC coupling across the dialing circuit and to reduce transmission loss due to the dialer in the circuit path. The zener diode 53 also is connected between lines 41 and 46 and functions as a voltage regulator to maintain the voltage between these lines at the desired value and also provides reverse voltage protection for the capacitor 123, while providing a DC path during reverse battery on the telephone lines. The diode 47 in the energy storage circuitry 12 provides for decoupling of the telephone line 46 from the capacitor 116 and also prevents loop transients due to the dialing pulses from affecting the energy storage capacitor 116.

In this manner, the pulser switch circuit 13, together with the voltage regulator and energy storage circuit 12, provides the desired digital pulses which are generated by the relaxation oscillator 11 and the ÷ 2 flip-flop A and are counted by the decade counter B to be transmitted as digital pulses to the telephone line from the emergency digital pulsing device 10 to the central office 23, with the required interdigital timing provided by the flip-flop circuitry 15 and the oscillation stop circuit 14, so that the digital pulsing for each digit transmitted can be readily recognized by the central office equipment. This digital generating and transmitting by the simple pushing of one of the emergency push-button switches 18 or 19, without the deposit of a coil in the conventional pay station equipment, is made possible by the ground and enable circuitry 22 in combination with the initial delay and resetting of the system provided by the cross-connected gating circuitry 21. In addition, the latching circuits of the control gate C assure the proper operation of the emergency dialing device 10, which assures a completion of the generation and transmission of the required digital pulses from the pay station to the central office equipment, once one of the emergency push button switches 18 or 19 has been pushed, regardless of subsequent repeated operation of the push button switches or alternate operation of such buttons or of a simple initial instantaneous closing of one of the buttons and subsequent release thereof. This is a very important aspect of the present invention as persons normally requiring the use of this emergency dialing device often are in an emotionally disturbed condition or trauma and are incapable of properly dialing the required operator to whom their emergency is to be transmitted by the telephone in the pay station.

While a particular embodiment of this invention has been illustrated and described, modifications thereof will occur to those skilled in the art. It is to be understood, therefore, that this invention is not to be limited to the exact details disclosed.

I claim:

1. In a telephone system having a call station with a telephone and conventional switch means for initiating call signals from said call station through an exchange with lines extending therebetween for supplying energizing signal and voice voltages to said call station for completing calls from said call station, circuit breaker means operable by said phone for closing a telephone energizing circuit responsive to placement of said telephone in an operative condition, auxiliary automatic dialing means having means for automatically generating a first predetermined number in the form of dialed pulses to provide access from said call station to an emergency operator, means for automatically generating a second predetermined number in the form of dialed pulses to provide access from said call station to a general purpose operator, an initial delay enabling circuit for energizing said telephone system to enable access to each of said operators without operation of said conventional switch means and for providing a predetermined time delay prior to generation of either of said first or second predetermined numbers, latching circuit means for enabling the generation and transmission of either of said predetermined numbers upon initiation of operation of said auxiliary automatic dialing means irrespective of subsequent operation of said automatic dialing means, said auxiliary automatic dialing means comprising an oscillator for generating digital pulses having a predetermined timing frequency, a logic circuit receiving the output of said oscillator for halving the frequency of said digital pulses, a counter circuit for counting the pulses generated by said oscillator, and a pulse switch circuit responsive to the output of said logic circuit for transmittal of said digital pulses produced by said oscillator to thereby provide predetermined emergency digit signal pulses over said lines from said call station to said exchange, and means responsive to replacement of said call station telephone in a non-operative position for resetting said auxiliary means to an initial restartable condition.

2. A telephone system auxiliary means as defined in claim 1 including means for setting said auxiliary means in a predetermined starting condition during said initial delay.

3. A telephone system auxiliary automatic dialing means as defined in claim 1 wherein said call station is a coin-responsive operating means station and said auxiliary means includes means for bypassing said coin-responsive operating means for energizing said auxiliary means.

4. A telephone system auxiliary automatic dialing means as defined in claim 1 wherein said auxiliary means includes a manually operable circuit-closing means for energizing said pulse generating circuitry in response to closure of said circuit closing means.

5. A telephone system auxiliary automatic dialing means as defined in claim 4 wherein said manually operable circuit-closing means comprises means for selectively counting and transmitting one of a plurality of predetermined sets of digit signal pulses.

6. A telephone system auxiliary automatic dialing means as defined in claim 5 wherein said selective means includes an AND-OR mode select and system latch gate for selecting a predetermined operating mode and latching the system for generating a predetermined set of digit signal pulses.

7. A telephone system auxiliary automatic dialing means as defined in claim 6 wherein said selective means includes means for providing a predetermined delay in digital pulse generation between digital signals representing the predetermined digits of the set selected by said manually operable circuit-closing means.

8. A telephone system auxiliary automatic dialing means as defined in claim 4 wherein said auxiliary means includes a latching circuit connected to said pulse generating circuitry and to said circuit closing means for latching the energization of said pulse generating circuitry for the duration of the generation of said predetermined emergency digit signal pulses by said pulse generating circuitry regardless of operation of said circuit closing means to open and subsequent closed positions, and means for stopping signal pulse generation on completion of said predetermined emergency digit signal pulses.

9. A telephone system auxiliary automatic dialing means as defined in claim 4 wherein said auxiliary emergency pulse means includes means for resetting said auxiliary means to an initial starting condition responsive to initial closure of said manually operable circuit closing means and prior to energization of said pulse generating circuitry.

10. A telephone system auxiliary automatic dialing means as defined in claim 4 wherein said latching circuit is connected to said pulse generating circuitry and to said circuit closing means for latching the energization of said pulse generating circuitry for the duration of the generation of said predetermined emergency digit signal pulses by said pulse generating circuitry regardless of operation of said circuit closing means to open and subsequent closed positions, and means for stopping signal pulse generation on completion of said predetermined emergency digit signal pulses, and wherein said auxiliary means includes means for resetting said auxiliary means to an initial starting condition responsive to initial closure of said manually operable circuit closing means and prior to energization of said pulse generating circuitry.

11. A telephone system auxiliary automatic dialing means as defined in claim 1 wherein said oscillator means provides a substantially 60 percent break and 40 percent make pulsing ratio.

12. A telephone system auxiliary automatic dialing means as defined in claim 11 wherein said oscillator means comprises means for providing a 600 millisecond minimum interdigit time.

13. A telephone system auxiliary automatic dialing means according to claim 1 wherein said logic circuit comprises a divide-by-two flip-flop circuit.

14. A telephone system auxiliary automatic dialing means according to claim 1 wherein said oscillator is a relaxation oscillator.

* * * * *